(12) United States Patent
Lynch et al.

(10) Patent No.: US 7,513,160 B2
(45) Date of Patent: Apr. 7, 2009

(54) DIGITAL PULSED PHASE LOCKED LOOP

(75) Inventors: John E. Lynch, Williamsburg, VA (US);
David M. Blaker, Roanoke, VA (US);
David J. Colatosti, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 64 days.

(21) Appl. No.: 11/806,475

(22) Filed: May 31, 2007

(65) Prior Publication Data

US 2007/0290912 A1  Dec. 20, 2007

Related U.S. Application Data

(60) Provisional application No. 60/810,625, filed on Jun. 5, 2006.

(51) Int. Cl.
*G01N 29/04* (2006.01)

(52) U.S. Cl. .............................. 73/602; 73/599; 73/600

(58) Field of Classification Search ................. 73/602, 73/579, 597, 598, 599, 600, 587, 618, 778, 73/799, 801, 627, 628, 645; 367/97; 375/376; 702/189; 600/441, 443
See application file for complete search history.

(56) References Cited

U.S. PATENT DOCUMENTS

| | | | | |
|---|---|---|---|---|
| 4,363,242 A | 12/1982 | Heyman | ................. | 73/761 |
| 4,624,142 A | 11/1986 | Heyman | ................. | 73/597 |
| 5,150,620 A | 9/1992 | Allison | ................. | 73/862.59 |
| 5,214,955 A | 6/1993 | Yost et al. | ................. | 73/24.05 |
| 5,237,516 A | 8/1993 | Heyman | ................. | 364/508 |
| 5,404,743 A | 4/1995 | Froggatt | ................. | 73/1 B |
| 5,617,873 A | 4/1997 | Yost et al. | ................. | 128/748 |
| 5,635,619 A * | 6/1997 | Udpa et al. | ................. | 73/1.82 |
| 5,771,204 A * | 6/1998 | Froggatt | ................. | 367/97 |
| 6,475,147 B1 | 11/2002 | Yost et al. | ................. | 600/438 |
| 6,601,451 B1 * | 8/2003 | Roberts | ................. | 73/579 |
| 6,608,876 B2 * | 8/2003 | Yamazaki | ................. | 375/376 |
| 6,740,048 B2 | 5/2004 | Yost et al. | ................. | 600/561 |
| 6,761,695 B2 | 7/2004 | Yost et al. | ................. | 600/561 |
| 6,773,407 B2 | 8/2004 | Yost et al. | ................. | 600/561 |
| 7,017,422 B2 | 3/2006 | Heyman et al. | ................. | 73/827 |
| 7,047,809 B2 * | 5/2006 | Cobb | ................. | 73/599 |
| 7,062,414 B2 * | 6/2006 | Waite et al. | ................. | 702/189 |
| 7,082,833 B2 | 8/2006 | Heyman et al. | ................. | 73/598 |
| 2006/0025686 A1 | 2/2006 | Ueno et al. | ................. | 600/443 |
| 2008/0022773 A1 * | 1/2008 | McKenna et al. | ................. | 73/597 |

OTHER PUBLICATIONS

International Search Report and Written Opinion of the International Searching Authority mailed Mar. 7, 2008 in corresponding PCT Application PCT/US07/12833.

* cited by examiner

*Primary Examiner*—Hezron E. Williams
*Assistant Examiner*—Jacques M. Saint-Surin
(74) *Attorney, Agent, or Firm*—Nixon & Vanderhye P.C.

(57) ABSTRACT

A digital pulsed phase locked loop (DPPLL) provides exact measurements of echo phase, time, and/or position delay as well as echo amplitude. These exact measurements provide better and more reliable results that directly benefit the many real world applications for the DPPLL. The DPPLL permits simultaneous tracking of multiple echo pulses and considerably improved echo selection and sampling.

26 Claims, 12 Drawing Sheets

DIGITAL PULSED PHASE LOCKED LOOP

RELATED APPLICATION

This application claims the priority and benefit of U.S. Provisional patent application 60/810,625, filed Jun. 5, 2006, which is incorporated herein by reference in its entirety.

STATEMENT REGARDING FEDERALLY SPONSORED RESEARCH OR DEVELOPMENT

Work on this patent application was supported in part by a government contract, #DAAD19-03-C-0139, an SBIR contract funded by the Army Research Laboratory.

TECHNICAL FIELD

The technical field relates to a pulsed phase locked loop and to applications thereof such as measure small changes in the ultrasonic path length of a material.

BACKGROUND

An analog ultrasonic pulsed phase locked loop (PPLL) has demonstrated parts-in-ten million resolution for measuring changes in the time of flight of an ultrasonic tone-burst. Analog ultrasonic pulsed phase locked loops have been used in diverse applications such as determining the load state of a fastener, measuring residual stress and nonlinear elastic constants, measuring intracranial and intramuscular pressure, measuring groundwater flows, measuring changes in the temperature of a water bath, and others.

The analog PPLL (APPLL) achieves its high resolution with a feedback loop architecture that maintains a constant 90° phase difference between a transmitted ultrasonic pulse and a received echo of that pulse from a test sample, sometimes simply referred to as an echo. To maintain this phase difference, the analog PPLL detects the phase of a sampled region of the received echo pulse, and changes the frequency of the next transmitted pulse to maintain phase quadrature (i.e., a 90° phase difference) between that transmitted pulse and the echo sample. Under this quadrature phase difference condition, the frequency of the transmitted pulse must be a harmonic of the fundamental frequency of the transmitted pulse defined by the following relation:

$$f_m = mv/2l \quad (1)$$

where $f_m$ is the $m^{th}$ harmonic of the fundamental resonance frequency, v is the speed of sound in the transmitting medium, and l is the one-way propagation distance from the transmitter to sample under test. Equation (1) defines a resonance condition which is used to convert the frequency output of the APPLL into the speed of sound v or the ultrasonic path length l. These two parameters, v and l, may then be used to assess certain material properties of an object under test, such as elasticity, temperature or density.

In an analog PPLL, a phase detector estimates the phase of a received echo pulse, (usually a set of echo pulses), and feeds this received echo signal back to a voltage-controlled signal generator. If the echo signal phase is not in quadrature with the transmitted pulse signal, the signal generator shifts the frequency of the next transmitted pulse so that the resonance condition is met. The "loop" includes the pulse generator/transmitter (e.g., a voltage controlled oscillator), the echo pulse receiver, and the phase comparator or detector with the feedback of the phase difference to the pulse generator/transmitter.

The heart of the analog PPLL is an analog mixer that functions as the phase detector forming the product between the output reference signal $V_1 = A_1 \sin(\omega_1 t + \phi_1)$ and the return echoes $V_2 = A_2(t)\sin(\omega_2 t + \phi_2)$, with $A_2(t)$ being a time-dependent function depending on the location of the various echoes. The output of the phase detector mixer, $V_M$, is defined below:

$$V_M = \tfrac{1}{2} A_1 A_2(t) \{\cos[(\omega_1 - \omega_2)t + (\phi_1 - \phi_2)] + \cos[(\omega_1 - \omega_2)t + (\phi_1 - \phi_2)]\} \quad (2)$$

In this application, the two frequencies are the same ($\omega_1 = \omega_2 = \omega$) so equation (2) reduces to:

$$V_M = \tfrac{1}{2} A_1 A_2(t) \{\cos(\Delta\phi) + \cos(2\omega t + \Sigma\phi)\} \quad (3)$$

The $2\omega t$ term is eliminated by applying a low-pass filter (coupled to the mixer output) to $V_M$ to yield a DC phase signal $V_P$:

$$V_P = \tfrac{1}{2} A_1 A_2(t) \cos(\Delta\phi) \quad (4)$$

Thus, the output of the filter depends on the amplitude of the transmitted pulse (i.e., the reference signal) and the received echo pulses as well as on the phase difference between the transmitted pulse and the received echo pulses. A sample-and-hold circuit (coupled to the filter's output) measures $V_P$ for a selected echo pulse, $A_2(t_1)$, and the output of the sample-and-hold circuit is then sent to an integrator (which averages out pulse-to-pulse noise in $V_P$). The integrator output h creates an error signal that is stabilized when $\Delta\phi = 90°$. For other values of $\Delta\phi$, a "ramp" (either increasing or decreasing) error signal is returned to the VCO control voltage, which forces a frequency shift in the VCO output (the transmit pulse) to the resonance condition of equation (1).

APPLLs rely on analog components and analog-based phase estimation methods. For example, U.S. Pat. Nos. 4,363,242; 5,404,743; 5,214,955; and 4,624,142 employ analog signal processing components to measure phase, such as the mixer, low-pass filter, sample and hold circuit, and integrator as described above.

But these components are subject to thermal drift and other noise sources that limit the resolution of the APPLLs or the time over which a measurement must be taken. In addition, analog-based PPLLs can only estimate phase error rather than calculate the actual phase error, and they do not provide an accurate amplitude of the echo being tracked. That echo amplitude information can be very useful information. It is also difficult for APPLLs to accurately select an echo pulse and an optimal sampling region of that pulse.

SUMMARY

The digital pulsed phase locked loop (DPPLL) described below overcomes these problems and provides exact measurements of the echo phase delay and echo amplitude. These exact measurements provide better and more reliable results that directly benefit the many real world applications for the DPPLL. The DPPLL's enhanced capabilities also readily permit simultaneous tracking of multiple echo pulses and permit considerably improved echo selection and sampling.

The DPPLL is more generally a digitally-based measurement apparatus. A digital transmit signal having a predetermined frequency and phase is generated, converted into an associated analog transmit signal, and directed to a test sample. That signal propagates through the test sample, and generates an echo signal. That echo signal associated with the test sample is detected and converted into digital form. The digital received echo signal and the digital transmit signal are then digitally processed to determine a phase relationship between the digital received echo signal and the digital transmit signal.

The phase relationship may be associated with a characteristic with the test sample, e.g., time delay, change in position, or other. The phase relationship or the associated characteristic may then be output for use in a particular sensing application. For example, a time delay associated with the phase relationship, wherein the time delay represents the change in time required for the analog signal to propagate through a test sample from one pulse to the next. The digital received echo signal and the digital transmit signal may also be digitally processed to determine and output an amplitude of the digital received echo signal.

In a non-limiting example embodiment, the digital transmit signal may be adjusted based on the phase relationship to maintain a constant phase relationship between the digital transmit signal and the digital received echo signal. A digital quadrature signal of the digital transmit signal is generated. The digital received echo signal is multiplied by the digital transmit signal to produce a first product, and the digital received echo signal is multiplied by the digital quadrature signal to produce a second product. A higher frequency component is filtered from the first and second products, and a phase difference is calculated from the filtered first and second products. In addition, an amplitude of the digital received echo signal is calculated from the filtered first and second products. The digital transmit signal is adjusted based on the phase difference to achieve or maintain a quadrature relationship between the digital transmit signal and the digital received echo signal.

In many applications, the digital received echo signal includes multiple echoes, with each echo having an associated echo waveform. In that case, a preferred but example approach is to select one of the echoes, and determine a sampling location of the waveform associated with the selected echo. One way for determining the area for sampling the waveform is using a tracking window. One non-limiting example tracking window procedure includes defining an initial tracking window for the selected echo waveform and determining an initial echo delay at which point the initial tracking window starts. A peak value of the selected echo waveform within the initial tracking window is determined; and a new tracking window relative to a location of the peak value, smaller than the initial tracking window, is defined. A length of the new tracking window is then determined based on a fraction of an amplitude of the peak value. Sampling occurs within this new tracking window.

Multiple received echoes associated with the test sample may also be processed simultaneously. The received echoes are converted into digital form. The digital received echoes and the digital transmit signal are digitally processed to determine a corresponding phase relationship between each of the digital received echoes and the digital transmit signal. Each phase relationship is associated with a characteristic with the test sample. The determined phase relationships or the associated characteristics are then output for use in any of a variety of sensing applications.

DETAILED DESCRIPTION

The following description sets forth specific details, such as particular embodiments, procedures, techniques, etc. for purposes of explanation and not limitation. But it will be appreciated by one skilled in the art that other embodiments may be employed apart from these specific details. In some instances, detailed descriptions of well known methods, interfaces, circuits, and device are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
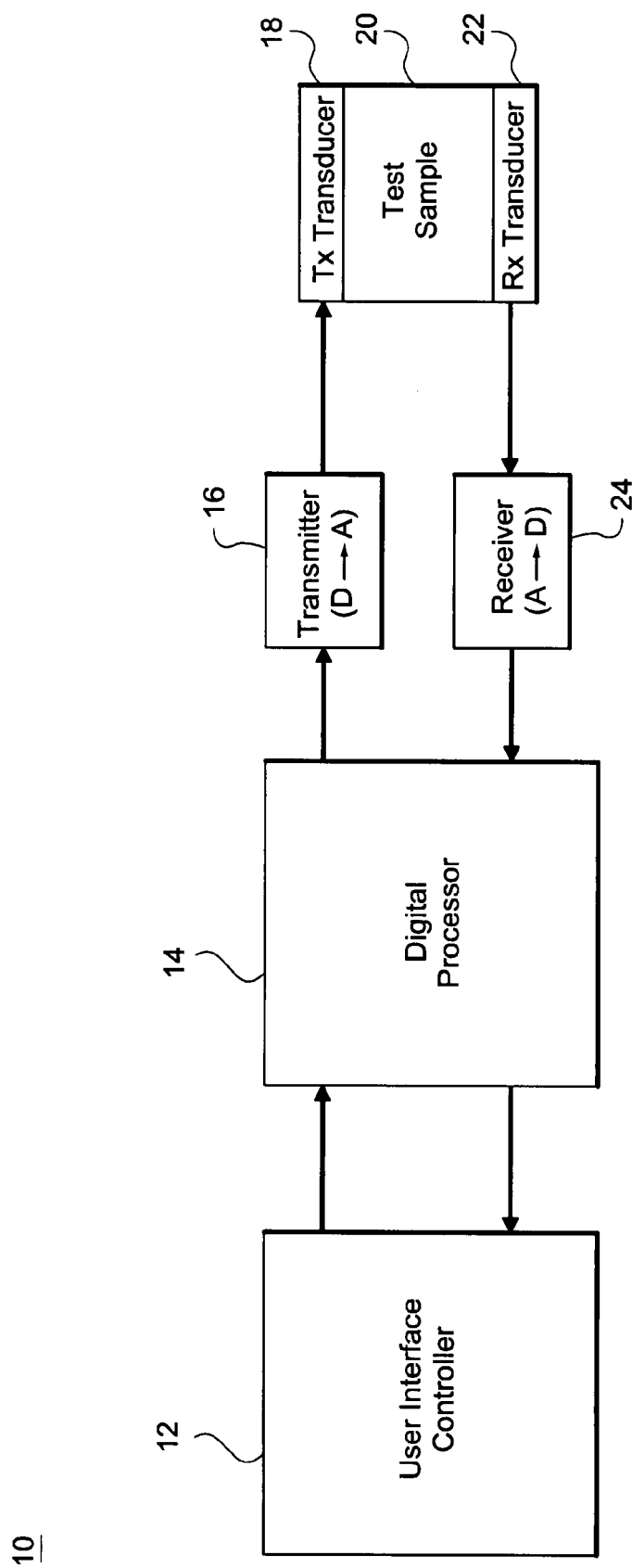
FIG. 1 shows a schematic block diagram of a non-limiting example of a digital pulsed phase locked loop (DPPLL)

FIG. 1 is a block diagram of a digitally-based measurement apparatus 10 that may be used to implement a digital pulsed phase locked loop (DPPLL). A user interface/controller 12 is coupled to a digital processor 14 and allows an operator to input operating parameters for the apparatus and receives for display, storage, and/or transmission to another entity information output by the digital processor 14. Non-limiting example operating parameters may include: a transmit frequency for the transmitted pulses, a number of cycles in the transmit pulse, a drive voltage for the transmit circuit, a gain for use in the receiver circuit, a range gage for the receiver circuit, a position of the echo or echoes within the range gate that the DPPLL should track, a loop gain of cutoff frequency for filtering a determined phase change from pulse-to-pulse, etc.

The digital processor 14 generates a transmit signal in accordance with the input parameters, performs various calculations described below, e.g., compares the time delay between the transmitted signal and the received signal, and outputs one or more useful indicators to the user interface.

The processor 14 is connected to a transmit circuit 16 which converts the digitally-generated transmit signal into an analog signal at a specified drive voltage. That analog signal drives a transmit (Tx) transducer 18 that propagates a transmit pulse signal through a test sample 20. The transducer 18 can be any suitable type of transducer (e.g., an ultrasonic type transducer that converts the transmit pulse signal into an ultrasonic wave), and it need not be in contact or even close proximity with the test sample but simply in a location from which it can effectively propagate the transmit pulse signal through the test sample 20. A receive (Rx) transducer 22 is shown for receiving one or a series of echo pulses generated as a result of the transmit pulse signal through the test sample 20. The receive transducer 22 can be any suitable type of transducer. For example, if the receive transducer 22 is an ultrasonic transducer, it converts the ultrasonic wave that has transmitted through the test sample into an electronic signal. Although the receiving transducer may be different from the transmitting transducer, as depicted in FIG. 1, it also may the same as the transmitting transducer 18. If the same transducer serves as a transmit and receiver transducer, the propagated wave propagates across the sample and back.

A receiver circuit 24 amplifies the electronic echo signal detected by the receiving transducer 22 (e.g., in accordance with a gain parameter provided via the user interface 12), filters electronic noise from the echo signal, and converts the analog echo signal into a digital echo signal for processing by the digital processor 14. The processor 14 processes the digital echo and the digital transmit signals to generate one or more parameters useful for the sensing application. For example, the two signals are compared and processed to calculate a phase difference associated with the echo signal that can be used directly or converted to some other parameter like a time delay, a change in position of the test sample, etc. and to calculate an amplitude of the echo signal. The phase difference or other parameter and the echo amplitude may be calculated with very high accuracy.

Figure 2:
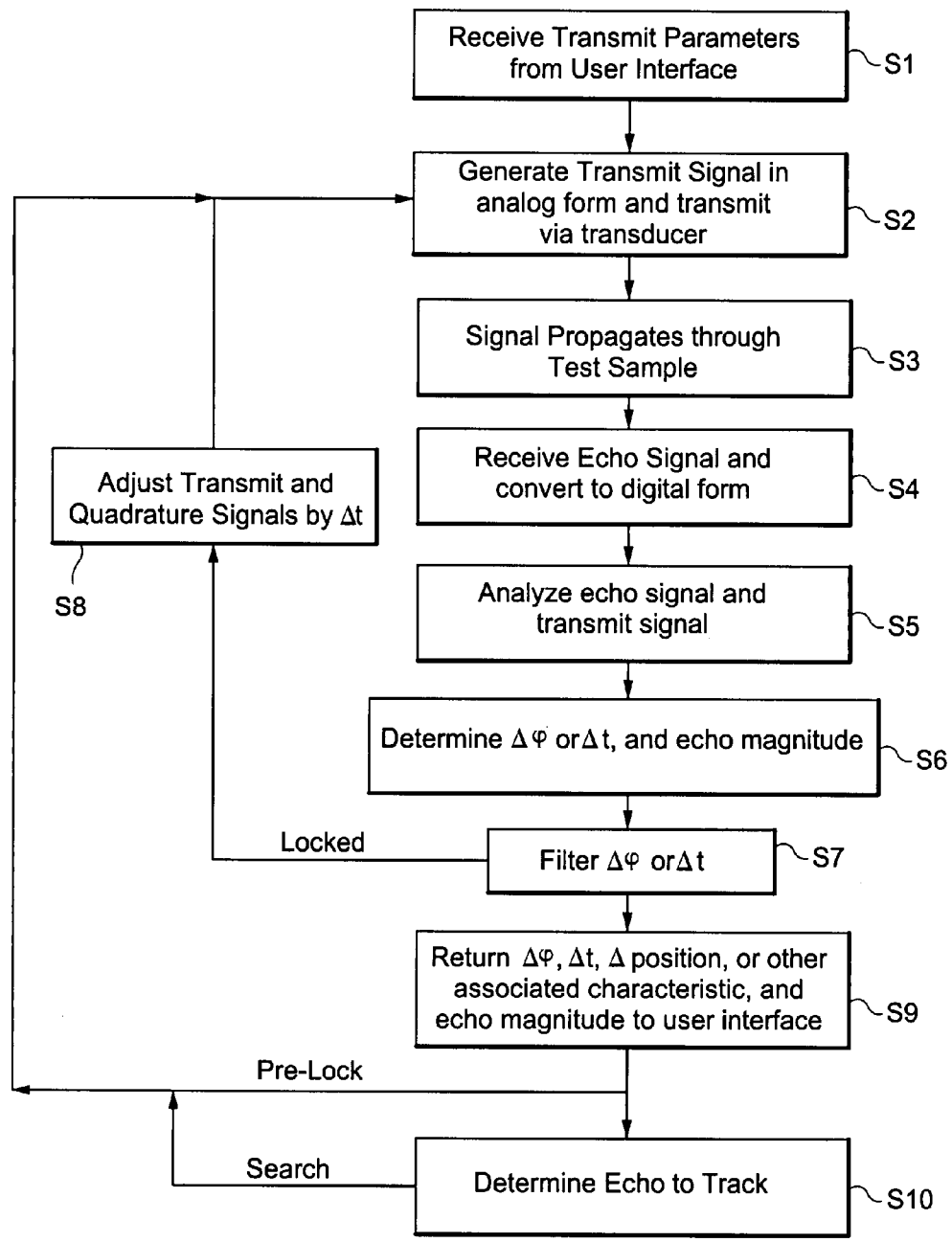
FIG. 2 is a flowchart outlining non-limiting example procedures in connection with operating a digital pulsed phase locked loop.

FIG. 2 is a flowchart diagram illustrating non-limiting example procedures for implementing a digital pulsed phase locked loop using for example the digitally-based measurement apparatus 10 from FIG. 1. One or more transmit parameters such as those described above may be received from the user interface (step S1), (or they may be preset), and based on one or more transmit parameters, an electronic transmit signal is generated and converted to analog format with the analog signal driving a transducer (step S2). The transducer signal propagates through a test sample (step S3), and the same or different transducer receives the echo signal from the test sample and provides it to the receiver circuit where the echo signal is converted into digital form (step S4). The digital echo is analyzed in the digital processor along with the digital transmit signal (step S5). As explained in an example below, the original digital waveforms and the received echo signal "train" are compared mathematically. That processing results in calculating a change in phase or a delay time associated with the echo as well as in echo magnitude (step S6). The phase or a delay time is then filtered (step S7), and the filtered phase or delay time is fed back to adjust the transmit and quadrature (or other phase reference) signals (step S8) as described in further detail below to complete the "loop" of the DPPLL. The filtered phase or a delay time associated with the echo is also provided along with the calculated echo amplitude to the user interface for use in the sensing application to which the DPPLL technology is applied (step S9).

In a non-limiting example implementation, which is preferable but optional, pre-lock, search, and locked modes may be used to locate and track a particular echo pulse at a desired point in the pulse waveform. During the pre-lock mode, a user adjusts an initial tracking position for an echo or echoes of interest (step S10). Once the user selects the echo(es), the DPPLL switches to the search mode, where the DPPLL refines the initial tracking position and target length (the duration of the echo) so that the DPPLL tracks the portion of the echo where the echo signal is the strongest. The DPPLL may be in the search mode for one iteration of the dPPLL loop during which the DPPLL "skips" step S6, converts the refined tracking position to the appropriate time units (such as samples on the A/D converter), and passes the refined tracking position to step S2 to start the DPPLL in the locked mode.

When the DPPLL is in the locked mode, the magnitude and phase signals are averaged over the tracking window to produce a phase difference signal. This phase difference signal is low-pass filtered and passed to step S8. As mentioned above, the average magnitude and phase over the selected echo is reported to the user interface in step S9. The average magnitude and phase may also be monitored to determine if the DPPLL is still tracking a valid echo or if it has lost track of the signal. If it has lost track of the signal, the DPPLL returns to the pre-locked mode so that the user may reset the target position to a valid echo.

If the DPPLL is in the locked mode, the filtered phase difference signal is passed to step S8, where the phase difference is converted into a time delay. The integer portion of the delay is used to adjust the start position of the target window, while the fractional portion is used to adjust the phase offset of the transmit reference signal for the next iteration of the loop. If the DPPLL is operating in an unlocked mode, the initial target position is returned to the waveform generator and the phase offset remains constant for each iteration of the loop.

Figure 3:
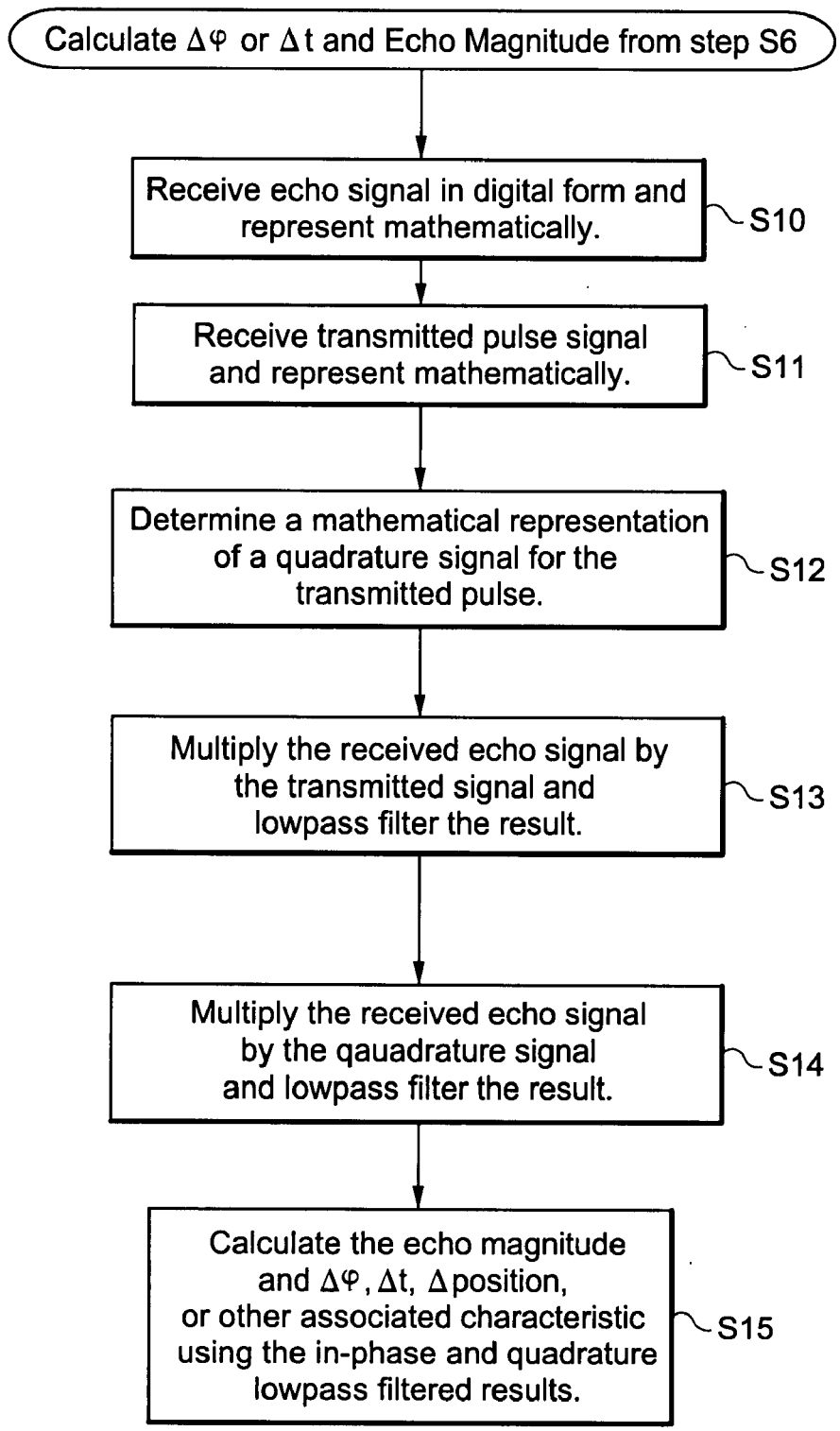
FIG. 3 is a flowchart outlining non-limiting example steps for calculating a change in phase or time delay and an echo magnitude referred to in the DPPLL procedures outlined in FIG. 2.

FIG. 3 is a flowchart diagram illustrating non-limiting example procedures for calculating a change in phase or time delay (Δt) and an echo magnitude referred to in step S6 in FIG. 2. The echo signal is received in the processor in digital form from the receiver circuit and represents it mathematically as:

$$R = A_r(t)\cos(\omega t + \phi_r), \quad (5)$$

where $A_r(t)$ is the amplitude of the received signal, t is the time at which the receiver detects the signal, $\omega$ is the frequency of the signal and $\phi_r$ is the initial phase of the signal (step S10).

The processor also receives or previously stored the transmitted digital pulse signal and represents it mathematically as:

$$I = \cos(\omega t + \phi_t) \quad (6)$$

where $\phi_t$ is the initial phase of the digital output signal (step S11). Generally, $\phi_t(N+1) = \phi_r(N)$, where N is the transmitted pulse number, so that the phase difference $\Delta\phi = \phi_t - \phi_r = 0$. Next, a quadrature signal 90° out of phase with the transmitted digital pulse signal is generated (step S12), and it is represented mathematically as:

$$Q = \sin(\omega t + \phi_t) \quad (7)$$

The processor multiplies the received signal in equation (5) by the digital transmit pulse signal in equation (6) to produce:

$$M_I = \frac{1}{2} A_r(t)\cos(\Delta\phi) - \cos(2\omega t + \phi_t + \phi_r) \quad (8)$$

The product $M_I$ is lowpass-filtered which removes the high frequency components, i.e., the second term, (step S13), producing the following signal in which the $2\omega t$ terms from (8) above have been removed:

$$L_I = \tfrac{1}{2} A_r(t) \cos(\Delta\phi) \qquad (9)$$

Similarly, the processor multiplies the received signal in equation (5) by the quadrature signal in equation (7) to produce:

$$M_Q = \tfrac{1}{2} A_r(t) \sin(\Delta\phi) - \sin(2\omega t + \phi_t + \phi_r) \qquad (10)$$

The product $M_Q$ is lowpass-filtered which removes the high frequency components, i.e., the second term, (step S14), producing the following signal:

$$L_Q = -\tfrac{1}{2} A_r(t) \sin(\Delta\phi) \qquad (11)$$

Then in step S15, the echo amplitude $A_r(t)$ and the change in phase $\Delta\phi$ associated with that echo are calculated as follows:

$$A_r(t) = 2\sqrt{L_Q^2 + L_I^2} \qquad (12)$$

$$\Delta\phi = \tan^{-1}(L_Q/L_I) \qquad (13)$$

If desired, $\Delta\phi$ may be converted into a time delay $\Delta t$ using the following formula:

$$\Delta t = (2\pi\Delta\phi)/\omega \qquad (14)$$

Figure 4A:
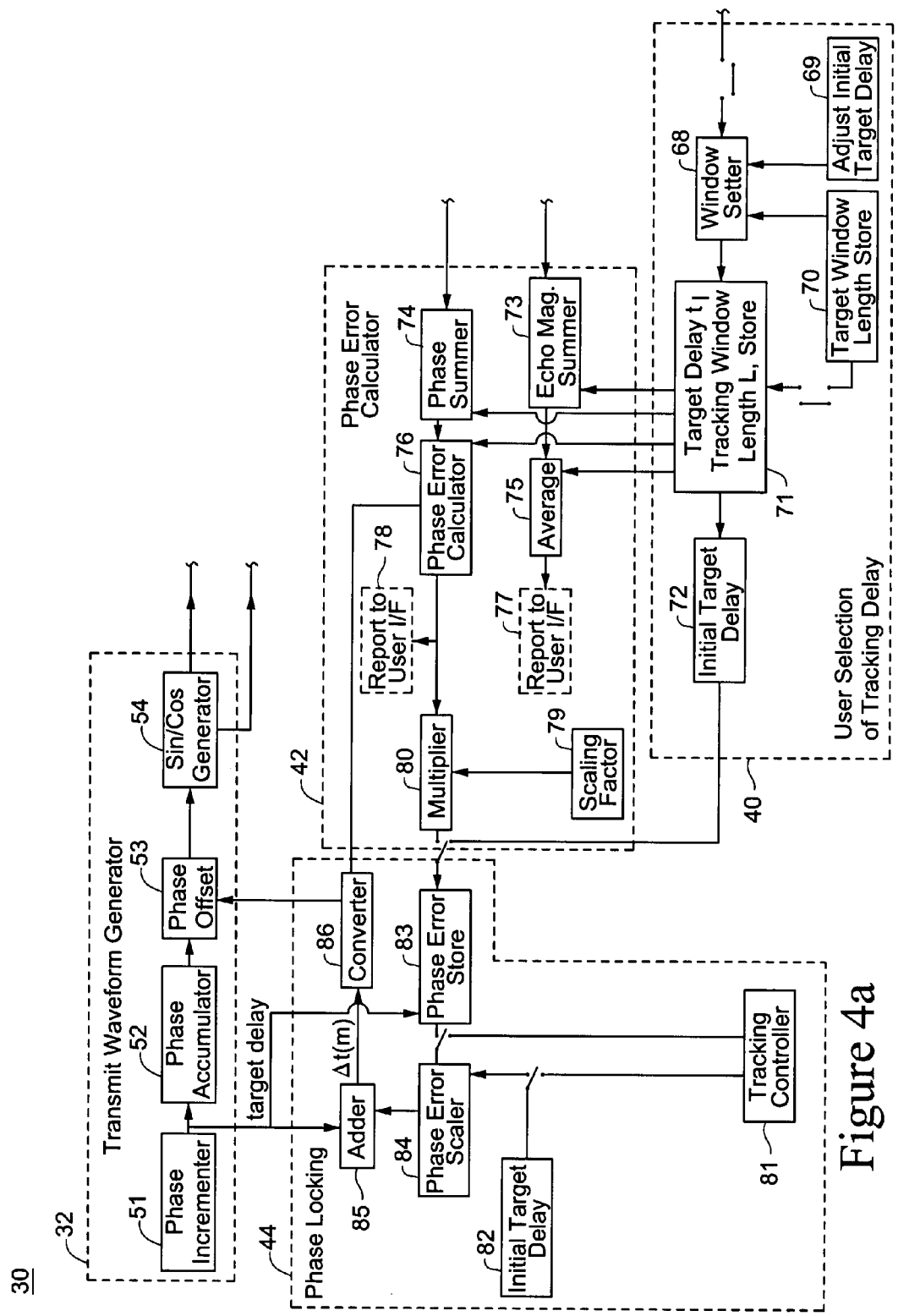
FIG. 4 is a detailed function block diagram illustrating a non-limiting example implementation of a digital pulsed phase locked loop (DPPLL)
Figure 4B:
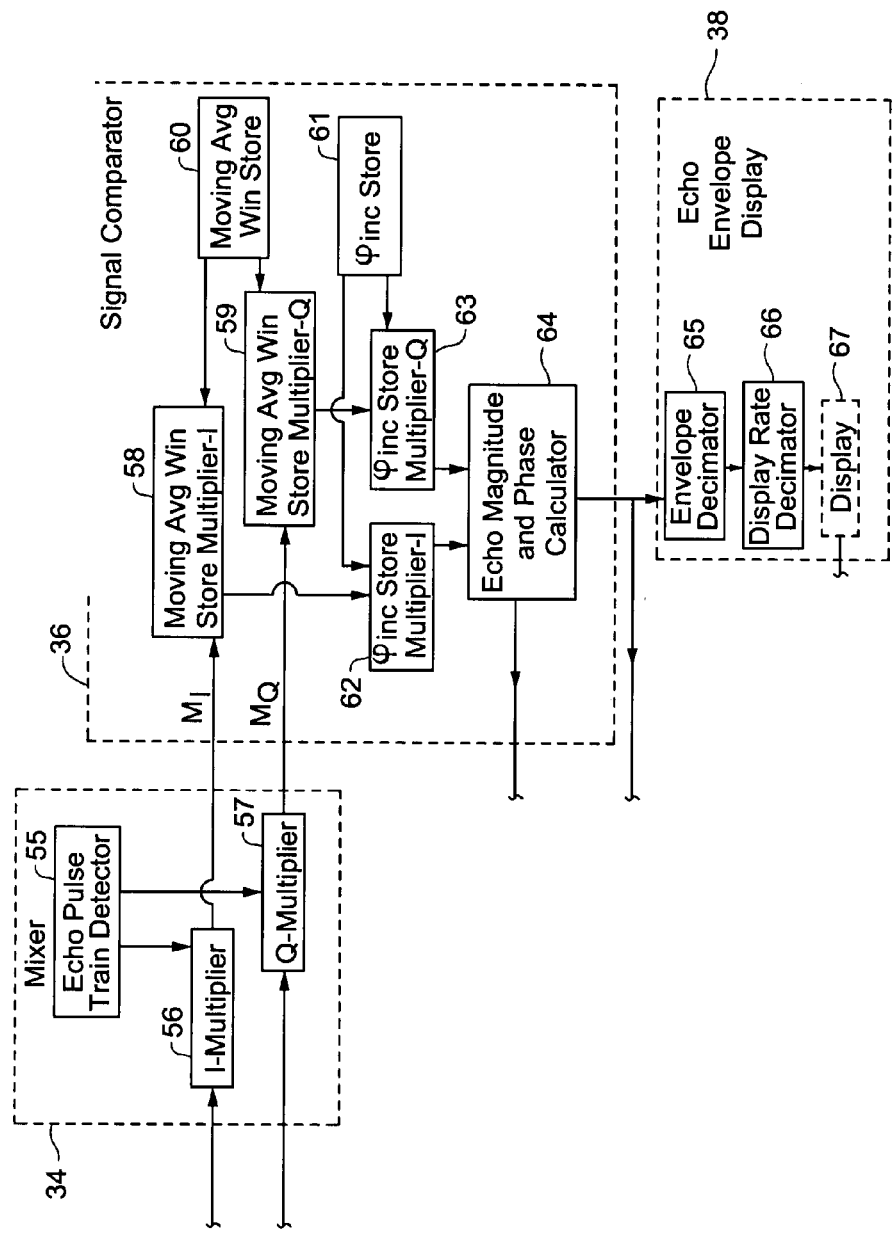

FIG. 4 is a detailed function block diagram illustrating a non-limiting example implementation of a digital pulsed phase locked loop (DPPLL) 30. The details are provided to show one way in which a DPPLL can be implemented but are not to be construed as limiting to the claims. To facilitate a understanding, the DPPLL 30 is first divided into higher level blocks outlined with dashed lines. These dashed blocks in turn include multiple function blocks used to implement the higher level function. These blocks are all preferably implemented using digital technology, though it may be desirable in some applications to employ some non-digital technology that does not have a significant adverse impact on the accuracy, resolution, and performance of the DPPL.

A transmit waveform generator 32 includes a phase incrementer 51, a phase accumulator 52, a phase offsetter 53, and a sin/cos generator 54. Coupled to the transmit waveform generator 32 is a mixer 34 that includes an echo pulse train detector 55, an in-phase (I) multiplier 56, and a quadrature phase (Q) multiplier 57. The mixer 34 is coupled to a signal comparator 36 that includes a moving average window in-phase (I) multiplier 58, a moving average window quadrature phase (Q) multiplier 59, a moving average window store 60, a phase increment store 61, a phase increment in-phase (I) multiplier 62, phase increment quadrature phase (Q) multiplier 63, and an echo magnitude and phase comparator 64. An echo envelope (magnitude) display 38 connected to the signal comparator 36 includes an envelope decimator 65, and display rate decimator 66, and a display 67. A user selection of tracking delay block 40 is coupled to the echo envelope display 38 and includes a window setter 68, an adjust initial target delay 69, a target window length store 70, a target delay tracking window length store 71, and an initial target delay 72. A phase error calculation block 42 connected to the echo magnitude a phase comparator 64 includes an echo magnitude summer 73, an averager 75, a report-to-user interface block 77, a phase summer 74, a phase error calculator 76, a report-to-user interface block 78, a scaling factor 79, and a multiplier 80. A phase locking block 44 is coupled to the transmit waveform generator 32 and to the phase error calcu-lation block 42. The phase locking block 44 includes a tracking controller 81, an initial target delay 82, a phase error store 83, a phase error scaler 84, an adder 85, and a converter 86.

In the waveform generator 32, the reference waveforms (which corresponds to and are at the same frequency as the physically-transmitted waveform to ensure correct phase measurements) are generated using a numerically-controlled oscillator which includes the phase accumulator 52 and the sin/cos generator 53. The phase accumulator 52 divides the complex plane unit circle into a discrete number of slices. The rate at which the unit circle is "traversed" is determined by the phase incrementer 51. The larger the phase increment, the larger the step in traversing around a unit circle, and thus the full traverse of the circle is completed in less time, which equates to a higher frequency reference waveform. The phase increment is specified as:

$$\phi_{inc} = \frac{ReferenceFrequency}{A/D\_Frequency} \qquad (15)$$

Using the relationship $$f = \frac{\Delta\phi}{\Delta t},$$

where f is the reference frequency and $\Delta\phi$ is the change in phase within the phase accumulator for a given clock cycle $\Delta t$, the phase increment 51 and phase accumulator 52 provide input data for the sin/cos generator 54 to generate in-phase I and quadrature Q transmit reference waveforms (provided to the corresponding I-multiplier 56 and Q-multiplier 57 in the mixer 34). In addition, a phase offset 53 ($\phi_{offset}$) is calculated from the signal return of the feedback loop and added to the following I and Q output signals:

$$I = \sin\!\left(2\cdot\pi\cdot\left[\left(\tfrac{\Delta\phi}{\Delta t}\cdot t\right) + \phi_{offset}\right]\right) \qquad (16)$$

$$Q = \cos\!\left(2\cdot\pi\cdot\left[\left(\tfrac{\Delta\phi}{\Delta t}\cdot t\right) + \phi_{offset}\right]\right). \qquad (17)$$

Using the relation $$\omega_o = 2\cdot\pi\frac{\Delta\phi}{\Delta t},$$

the I and Q waveforms can be re-written as:

$$I = \sin(\omega_o t + \phi_{offset}) \qquad (18)$$

$$Q = \cos(\omega_o t + \phi_{offset}) \qquad (19)$$

The detected echo signal or "train" of the form $R = A(t)\sin(\omega_o t + \phi_r)$ is received at the echo pulse train detector 55 and is multiplied with the I and Q waveforms in the multipliers 56 and 57, respectively. The output of I-multiplier 56 is:

$$M_I = \frac{A}{2}[\cos(\varphi_{offset} - \varphi_r) - \cos((2\omega_o t) + \varphi_{offset} + \varphi_r)] \quad (20)$$

and the output of Q-multiplier 57 is:

$$M_Q = \frac{A}{2}[-\sin(\varphi_{offset} - \varphi_r) + \sin((2\omega_o t) + \varphi_{offset} + \varphi_r)]. \quad (21)$$

where $\phi_r$ is the phase of the received signal.

Blocks 58-63 in the signal comparator 36 filter $M_I$ and $M_Q$ to eliminate the higher frequency $2\omega_o t$ terms from the equations 20 and 21. One non-limiting filtering example implementation for filtering the output of the digital multipliers is a moving average filter in which sample values are summed over range defined the variable MovingAvgWin. This is expressed mathematically by equations 22 and 23 below:

$$S_I(t) = \sum_{n}^{n+MovingAvgWin} \frac{A}{2}[\cos(\varphi_{offset} - \varphi_r) - \cos((2\omega_o t) + \varphi_{offset} + \varphi_r)] \quad (22)$$

$$S_Q(t) = \sum_{n}^{n+MovingAvgWin} \frac{A}{2}[-\sin(\varphi_{offset} - \varphi_r) + \sin((2\omega_o t) + \varphi_{offset} + \varphi_r)] \quad (23)$$

When MovingAvgWin is set to an integer number of transmit wavelengths, the $2\omega_o t$ terms will sum to zero, eliminating the high frequency terms from equations 22 and 23. This condition is satisfied for the following relationship, which is stored as a parameter in store 60 based on the user-adjusted transmit frequency as follows:

$$MovingAvgWindow = \frac{1}{\phi_{inc}} \quad (24)$$

The inverse term, $$\frac{1}{MovingAvgWin} = \varphi_{inc},$$

stored as a parameter in $\phi_{inc}$ store 61 is multiplied with the output of blocks 58 and 59 in respective $\phi_{inc}$ store multipliers 62 and 63 resulting in the following two equations:

$$L_I(t) = \frac{A(t)}{2}[\cos(\Delta\varphi(t))] \quad (25)$$

$$L_Q(t) = \frac{A(t)}{2}[-\sin(\Delta\varphi(t))] \quad (26)$$

where $\Delta\phi = \phi_{offset} - \phi_r$ and the magnitude A and phase difference $\Delta\phi$ are given as functions of range or location t, as both will vary for successive echoes detected at different ranges (locations or positions).

After filtering out the high-frequency components, the echo magnitude A(t) and the echo phase difference $\Delta\phi(t)$ are calculated in an echo magnitude and phase calculator 64 for values of t as follows:

$$\Delta\varphi(t) = \tan^{-1}\left[\frac{-L_Q(t)}{L_I(t)}\right] \quad (27)$$

and a magnitude calculation:

$$A(t) = 2\sqrt{L_I^2(t) + L_Q^2(t)}. \quad (28)$$

An echo envelope display 38 receives the echo magnitude A(t) and echo phase difference $\Delta\phi(t)$ values from the signal comparator 36. Because the echo magnitude output A(t) is a low-frequency envelope of the received signal R=A(t)sin $(\omega_o t+\phi_r)$, the sample rate for t may be reduced by a factor of four without a loss of signal information when displaying the detected envelope to the user. This envelope A(t) preferably updates once per ultrasound pulse. At an example pulse repetition rate of a kilohertz or more, the display updates significantly faster than a user can track. In envelope decimator 65, the sample rate is reduced by a factor of 4 so the envelope A(t) along each range value (t), and the display rate is decimated by a factor of N in the display rate decimator 66 so that it is displayed only every N pulses to the user. The decimated envelope A(t') is displayed to the user in display 67.

The user selection of tracking delay 40 shows a switch between display 57 and window setter 58 to indicate that the tracking window is defined once during the initial setup of the DPPLL measurement, after which the DPPLL tracking algorithm updates automatically. Numerous implementations of the tracking window are possible, so the following implementation is only an example. The displayed envelope A(t') provides a suitable user interface to allow the user to select echoes to track using the DPPLL, using for example, a cursor. The user uses the cursor to adjust the position of the initial target delay $t_o$ (block 69) which defines the start position for a target window whose length, $L_o$ is stored in block 70. The initial target window length is defined by the transmit frequency and number of cycles in the transmit pulse, $N_{trans}$. $L_o$ may be set for example to the following:

$$L_o = \frac{(N_{trans} + 1)}{\varphi_{inc}} \quad (29)$$

Figure 5:
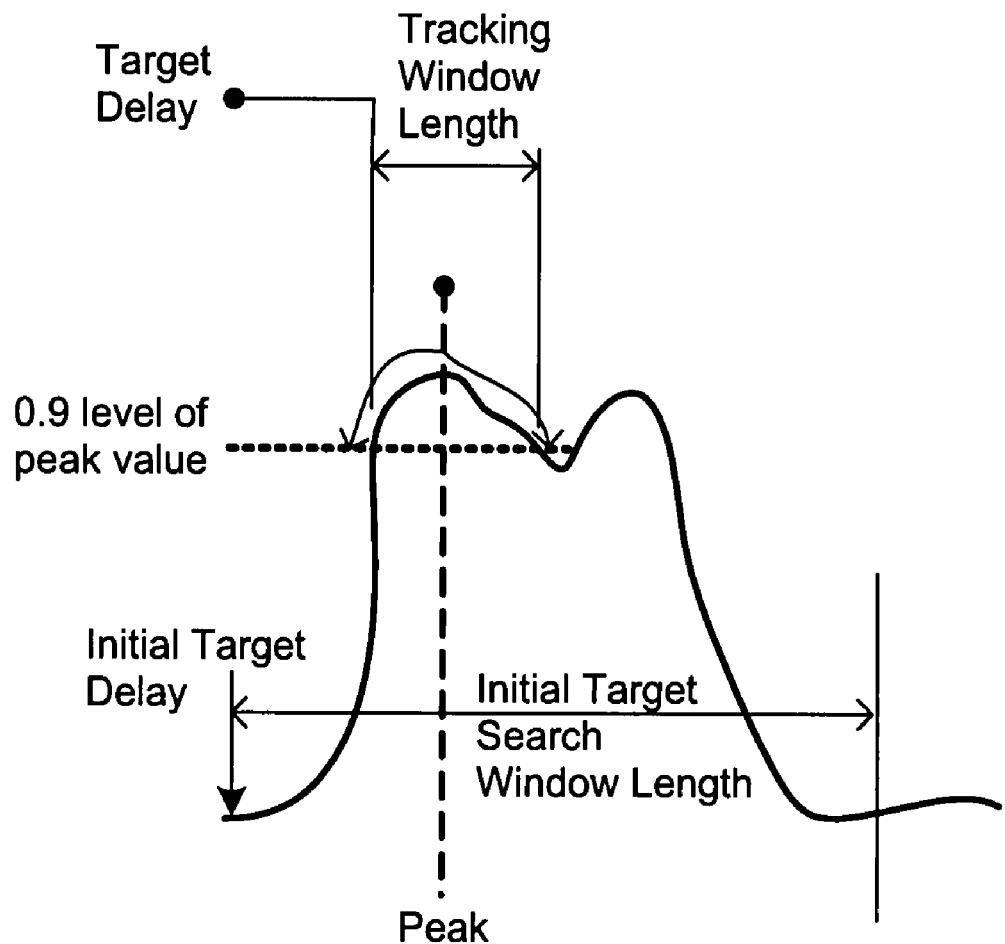
FIG. 5 is a graph illustrating an example window setting function.

The initial target delay, $t_o$, and initial target length, $L_o$, are passed to a window set function (block 68), which preferably refines the target start position and target window length based in the features of the echo to be tracked. The target start position is calculated by finding the peak or maximum value of the echo $A(t_{max})$ in the region from $A(t_o)$ to $A(t_o+L_o)$ and then searching forward and backward from $t_{max}$ to find the value before and after $t_{max}$, $A(t_-)$ and $A(t_+)$, where the echo falls below some fractional value of A $(t_{max})$, e.g., 0.9. This window setting procedure is illustrated in FIG. 5. The target delay $t_I$ and tracking window length $L_I$ parameters are stored in store 71. The target delay $t_I$ is passed to initial target delay block 22, where it is used for the first iteration of the DPPLL loop. The target delay $t_I$ and tracking window length $L_I$ define the location of the echo of interest so that the DPPLL can accurately track changes in the echo position with time.

The phase error calculator block 42 calculates a single magnitude and phase value for a selected echo is calculated. The echo magnitude summer 73 calculates the magnitude of the echo by summing the magnitude values within the tracked region as follows:

$$A_{sum} = \sum_{t=t_1}^{t_1+L_1} A(t) \quad (30)$$

This summation is converted into an average by dividing the summation by the number of samples in the tracking window (block 75)

$$A_{echo} = \frac{A_{sum}}{L_1} \quad (31)$$

This echo magnitude value is updated for each ultrasound pulse and is reported to the user interface for analysis and/or storage (block 77).

A similar summation and division is performed on the phase values (blocks 74 and 76) to produce the average phase difference over the echo, called the phase error $\Delta\phi_{error}$:

$$\Delta\varphi_{error} = \frac{1}{L_1}\sum_{i=t_1}^{t_1+L_1} A(t) \quad (32)$$

The phase error $\Delta\phi_{error}$ may also be reported to the user interface for analysis and/or storage (block 78). The phase error is gain adjusted (scaled) using a scaling factor α stored in block 79 that is applied to a multiplier 80, as in the following equation:

$$\Delta\phi'_{error}(m) = \alpha \cdot \Delta\phi_{error}(m) \quad (33)$$

where m represents the loop iteration number and $\Delta\phi'_{error}(m)$ is provided as a fractional value of the unit circle of the transmit frequency. Equation 33 represents a first order processing loop that removes high-frequency noise from the loop. Higher order process loops (such as IIR filtering) may be as an alternative to this low-pass filter.

An example implementation for phase locking 44 is now described. When a tracking controller 81 is turned off, a switch between a phase error store 83 and a phase error scalar 84 is open, and $\Delta\phi'_{error}(m)$ is not used to update the DPPLL. Instead, the initial target delay $t_o$ is returned for each loop iteration m (block 82). When the tracking controller 81 is turned on, $\Delta\phi'_{error}(m)$ is scaled back into terms of A/D samples and fractional samples (block 84) and added to the target delay (block 85) as expressed in the following equation:

$$\Delta t(m) = \frac{\Delta\varphi'_{error}(m)}{\varphi_{inc}} + \Delta t(m-1) \quad (34)$$

The integer portion of $\Delta t(m)$, given in terms of A/D samples, is used to adjust the start position of tracking window for the next iteration of the DPPLL, while the fractional portion of $\Delta t(m)$ is converted into a phase offset value in converter 86 as follows to generate the next output signal for the DPPLL:

$$\phi_{offset} = \text{fractional}(1-\text{fractional}(\Delta t(m) \cdot \phi_{inc}). \quad (35)$$

This phase offset value is then passed to the phase offset block 53, which updates $\phi_{offset}$ for the next iteration of dPPLL loop. This process is repeated until data acquisition stops or the DPPLL looses tracking.

Figure 6:
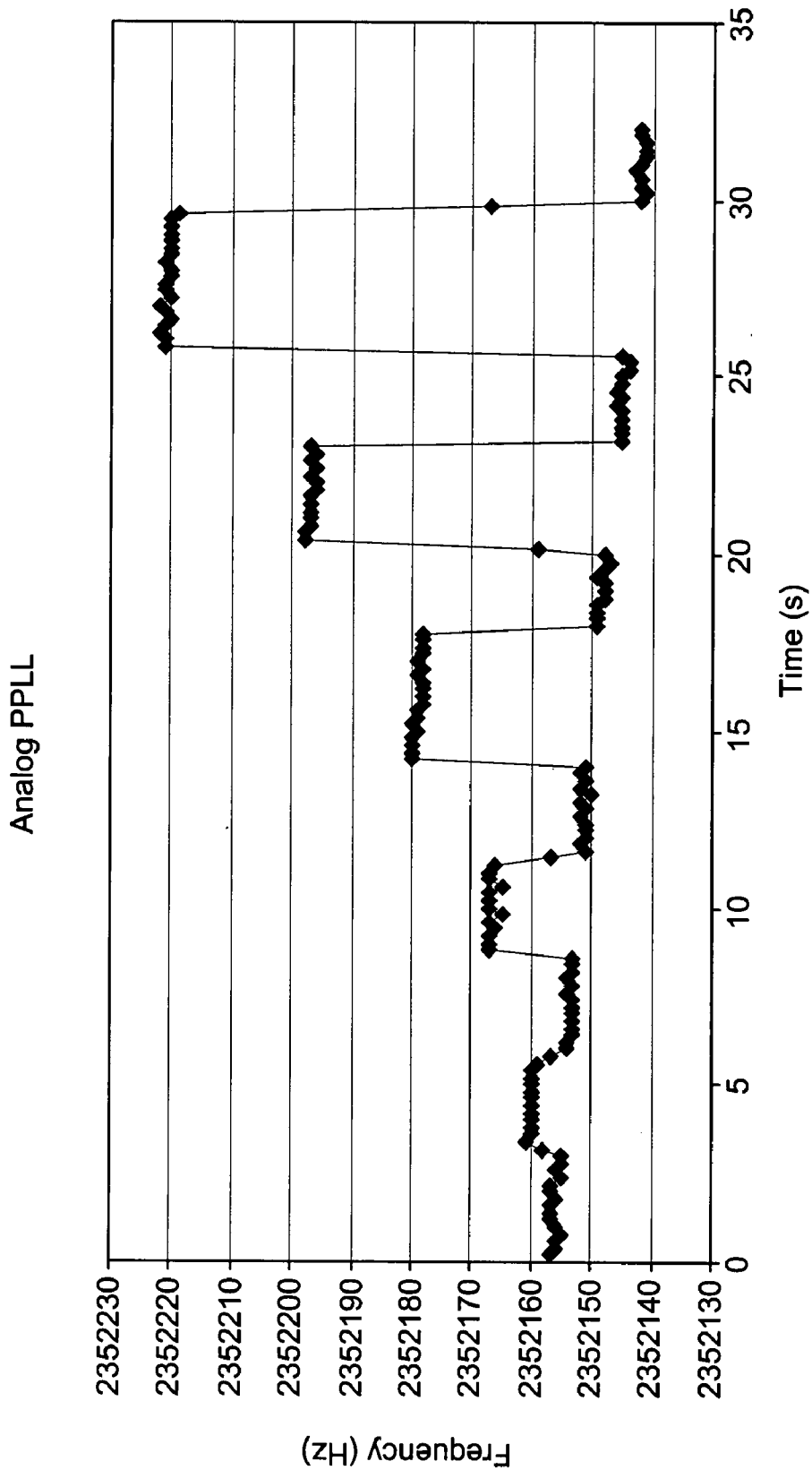
FIG. 6 is a graph showing an example analog PPLL readout while monitoring a sample undergoing cyclic compressive loading.
Figure 7:
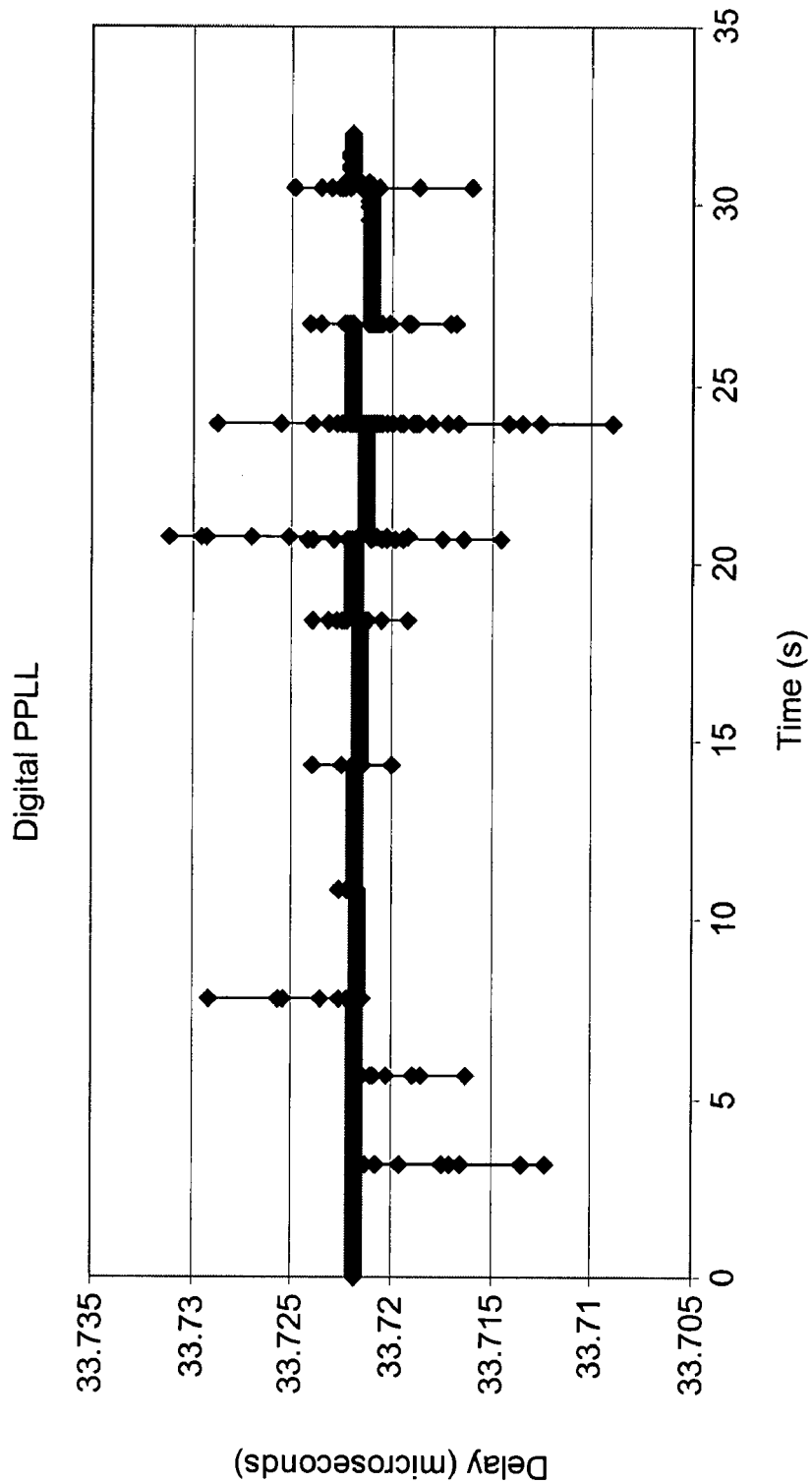
FIG. 7 is a graph showing an example digital PPLL readout while monitoring the same sample in FIG. 6.

The performance of an example analog PPLL was compared to that of an example digital PPLL. First, the APPLL and DPPLL were tested side-by-side on a test sample that underwent cyclical compressive loading on a materials testing system load frame. Loading the test sample creates stresses that compress the sample, making the ultrasonic path length shorter and increasing the speed of sound in the material. FIG. 6 shows the output of the analog PPLL, and FIG. 7 shows the output of the digital PPLL. The y-axis units of the analog PPLL are in frequency, and the output frequency increases as the sample is compressed. In the digital PPLL, the y-axis graphs delay in the more physically meaningful units of microseconds, and the delay decreases with compressive load. Significantly, the digital PPLL measures delay more often than the analog PPLL does, which means that it can update changes more quickly and can capture high frequency dynamics during loading and unloading that the analog PPLL cannot. These high frequency dynamics are shown as "spikes" visible during each loading/unloading stage in FIG. 7. Because the "spikes" have a high amplitude, the scale for the DPPLL plot is much larger than the scale for the APPLL plot.

Figure 8:
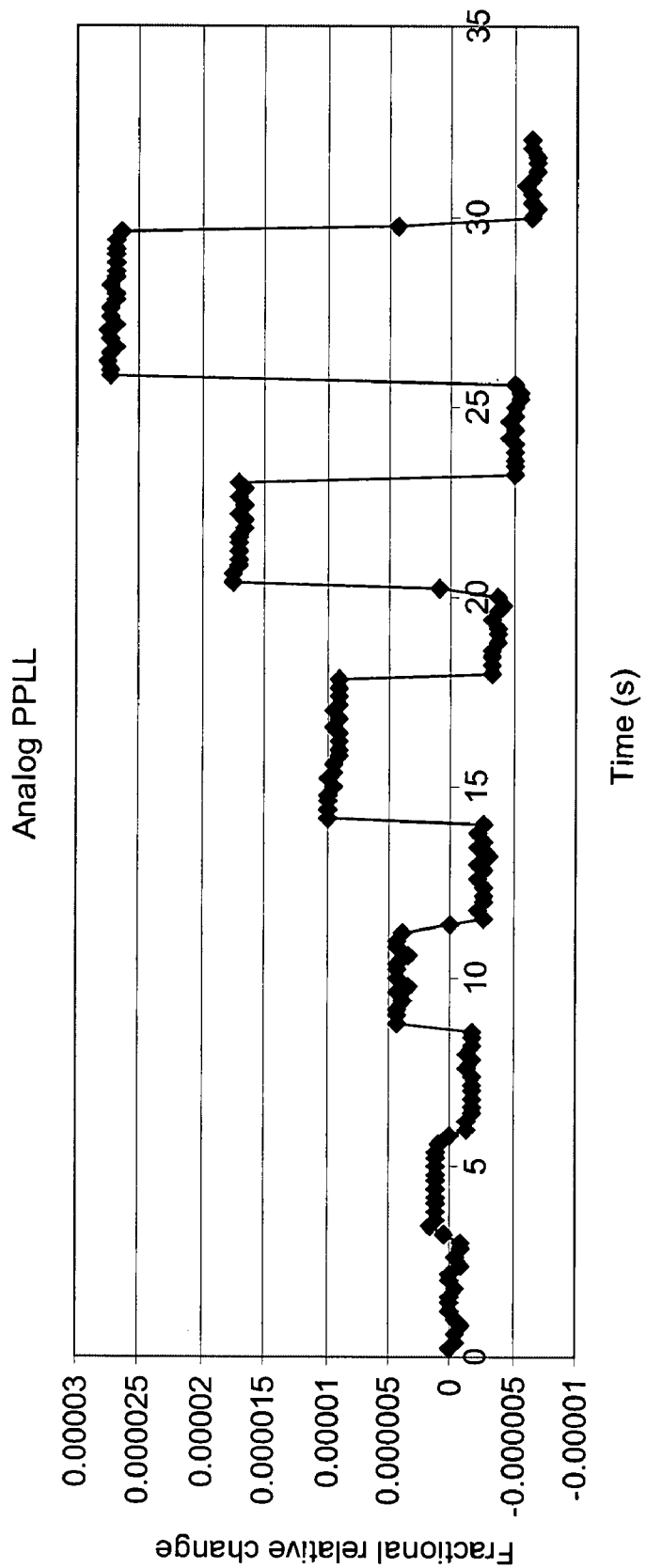
FIG. 8 is a graph showing a normalized plot of an example analog PPLL readout for a sample undergoing cyclic compressional loading.
Figure 9:
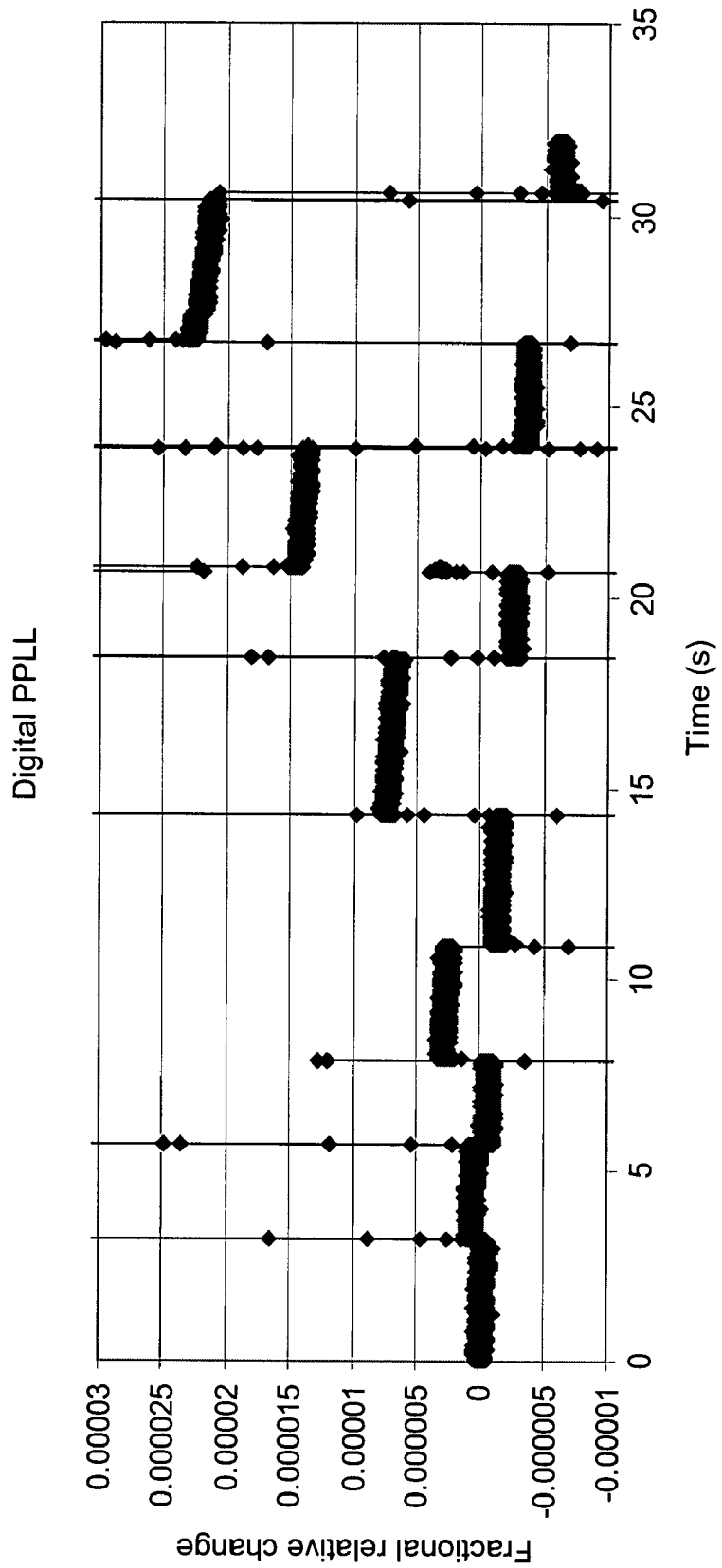
FIG. 9 is a graph showing a normalized plot of an example digital PPLL readout for a sample undergoing cyclic compressional loading.

Because the analog PPLL and the digital PPLL measure changes in the position of an echo in different units (frequency for the analog PPLL and microseconds for the digital PPLL), direct comparisons between FIGS. 6 and 7 are difficult. To enable a direct comparison, the y-axis can be normalized to show changes in position of an echo relative to the initial reading according to the following formula:

$$f_i = \frac{(y_i - y_o)}{y_o} \quad (36)$$

where $f_i$ is the fractional change in readout value at time i, $y_i$ is the readout value at time i, and $y_o$ is the initial readout value. A comparison of FIGS. 8 and 9 shows that when the APPLL and DPPLL readouts are normalized according to equation 36 and plotted on the same scale, the two systems detect similar cyclical loading behavior, but the DPPLL measures that loading at significantly greater resolution and accuracy.

Figure 10:
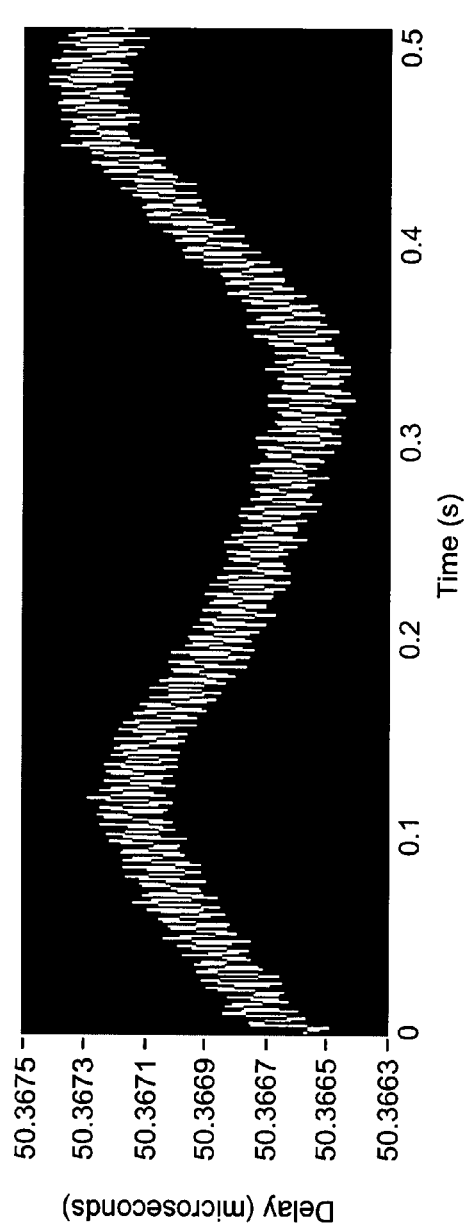
FIG. 10 is a graph showing displacement of a metal plate placed on a speaker head detected with an example digital PPLL.

The greater dynamic range of the digital PPLL is further illustrated in the following test, where a transducer was placed in a water column placed over a speaker head. Displacements of a metal plate placed on a speaker head detected with the digital PPLL. In this test, the speaker was driven with a 5 V, 1000 Hz signal. The 1000 Hz signal was superimposed on a low-frequency vibration caused by surrounding room noise. FIG. 10 shows that the digital PPLL can detect speaker displacements when driven at frequencies up to 1000 Hz. A comparable analog PPLL readout is not available, but from FIGS. 6 and 8, the analog PPLL is limited to detecting changes in the echo position at much lower frequencies in the 1-10 Hz range.

Figure 11:
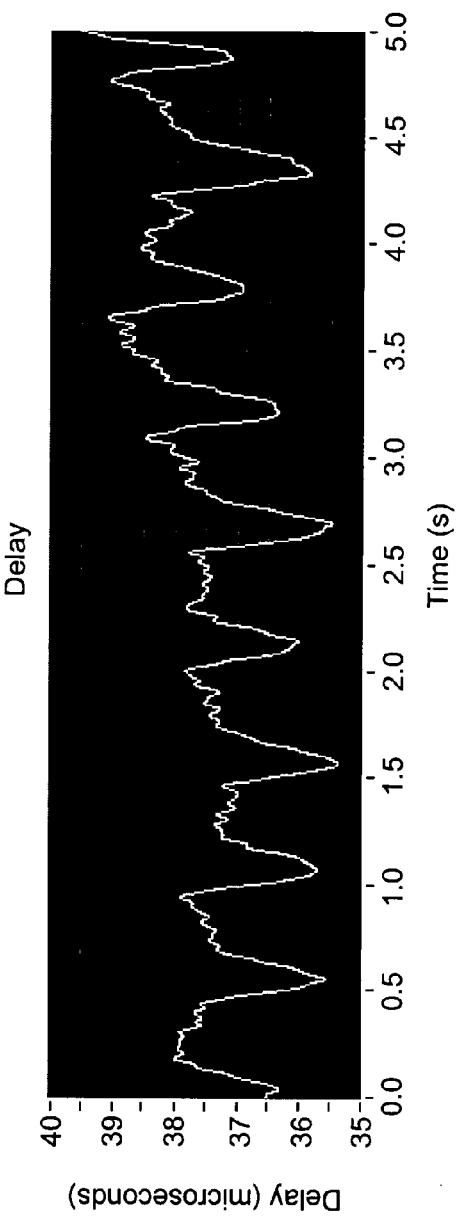
FIG. 11 is a graph showing an example digital PPLL delay readout showing the change in the position of an echo-producing tissue boundary in response to an arterial pressure pulse.
Figure 12:
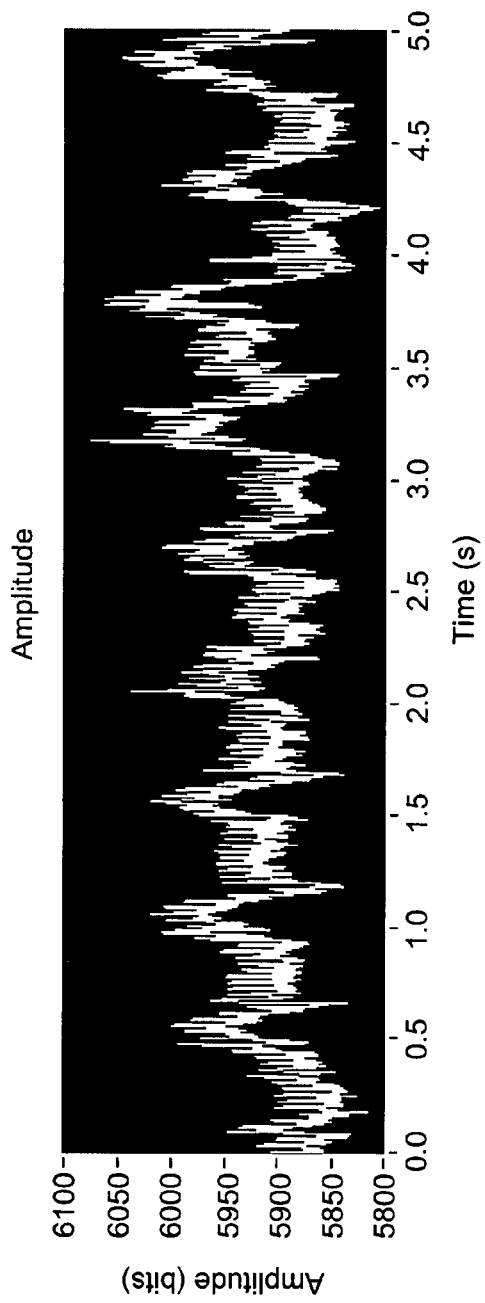
FIG. 12 is a graph showing an example digital PPLL magnitude readout showing the change in the amplitude of the echo tracked in FIG. 11 during arterial pressure pulses.
Figure 13:
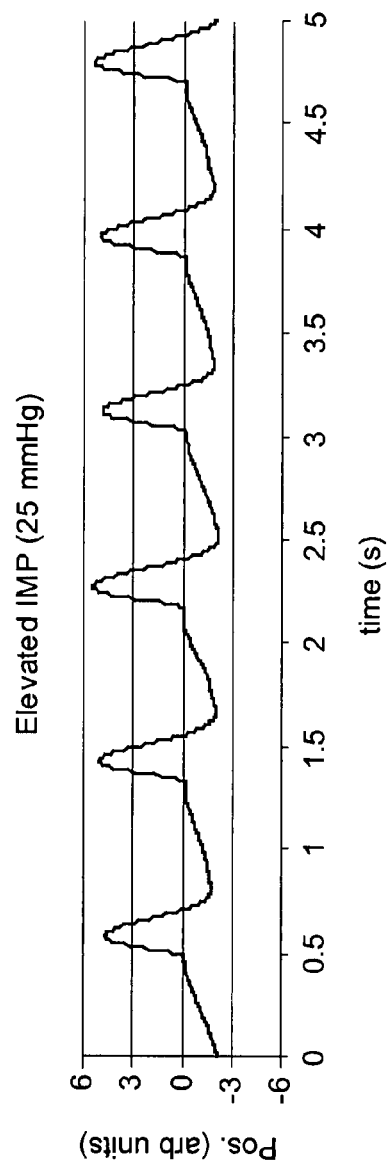
FIG. 13 is a graph showing an analog PPLL signal comparable to the two digital PPLL readouts shown in FIGS. 11 and 12.

FIGS. 11 and 12 show an output from the dPPLL measuring tissue dynamics. FIG. 11 is a digital PPLL delay (related to change in phase) readout showing the change in the position of an echo-producing tissue boundary in response to an arterial pressure pulse. FIG. 12 is a digital PPLL magnitude readout showing the change in the amplitude of the echo tracked in FIG. 11 during arterial pressure pulses. These two digital PPLL delay and magnitude signals may be used to more accurately characterize tissue properties than the single delay signal available from the analog PPLL shown in FIG. 13. The y-axis units represent a voltage readout equivalent to the frequency readout provided in FIG. 6. However, the contribution of the pulsation due to echo position cannot be separated from the contribution due to echo amplitude, making it more difficult to correlate the detected changes to tissue properties.

Multiple echoes may be tracked with the DPPLL by replicating the digital processor algorithms outlined in FIGS. 2-5 for multiple tracking windows. In this case, the same transmitted and received signals are processed digitally, one time per echo tracked.

The DPPLL enables exact measurements of the echo phase delay and echo amplitude that provide better and more reliable results with significant benefits to many real world applications for the DPPLL such as determining the load state of a fastener, measuring residual stress and nonlinear elastic constants, measuring intracranial and intramuscular pressure, measuring groundwater flows, measuring changes in the temperature of a water bath, etc. The DPPLL's enhanced capabilities also readily permit simultaneous tracking of multiple echo pulses and permit considerably improved echo selection and sampling. Simultaneously tracking of multiple echoes enables the DPPLL to measure how ultrasound propagation time changes within different regions of a material, which is especially useful in non-homogenous materials or in material systems with multiple boundary layers. Improved echo selection and sampling facilitate use of the DPPLL by people with only minimal training in ultrasonic instrumentation.

Although various example embodiments have been shown and described in detail, the claims are not limited to any particular embodiment or example. None of the above description should be read as implying that any particular element, step, range, or function is essential such that it must be included in the claims scope. Reference to an element in the singular is not intended to mean "one and only one" unless explicitly so stated, but rather "one or more." The scope of patented subject matter is defined only by the claims. The extent of legal protection is defined by the words recited in the allowed claims and their equivalents. All structural and functional equivalents to the elements of the above-described example embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC § 112 unless the words "means for" or "step for" are used. Furthermore, no feature, component, or step in the present disclosure is intended to be dedicated to the public regardless of whether the feature, component, or step is explicitly recited in the claims.

The invention claimed is:

1. A method for operating a digitally-based measurement apparatus, comprising:
    generating a digital transmit signal having a predetermined frequency and phase;
    converting the digital transmit signal into an associated analog transmit signal;
    directing the analog transmit signal to a test sample;
    detecting a received echo signal associated with the test sample;
    converting the received echo signal into digital form;
    digital processing the digital received echo signal and the digital transmit signal to determine a phase relationship between the digital received echo signal and the digital transmit signal, wherein the phase relationship is associated with a characteristic with the test sample; and
    outputting the phase relationship or the associated characteristic.

2. The method in claim 1, further comprising:
    digital processing the digital received echo signal and the digital transmit signal to determine an amplitude of the digital received echo signal, and
    outputting the determined amplitude.

3. The method in claim 1, further comprising:
    adjusting the digital transmit signal based on the phase relationship to maintain a constant phase relationship between the digital transmit signal and the digital received echo signal.

4. The method in claim 1, further comprising:
    determining a time delay associated with the phase relationship, wherein the time delay represents the change in time required for the analog signal to propagate through a test sample from one pulse to the next.

5. The method in claim 1, further comprising:
    driving a transducer with the analog transmit signal causing the transducer to radiate a signal that interacts with the test sample to generate one or more echo signals.

6. The method in claim 1, wherein the phase relationship is a phase difference, the method further comprising:
    generating a digital quadrature signal of the digital transmit signal;
    multiplying the digital received echo signal by the digital transmit signal to produce a first product;
    multiplying the digital received echo signal by the digital quadrature signal to produce a second product;
    filtering a higher frequency component from the first and second products; and
    calculating the phase difference from the filtered first and second products.

7. The method in claim 6, further comprising:
    calculating an amplitude of the digital received echo signal from the filtered first and second products.

8. The method in claim 6, further comprising:
    adjusting the digital transmit signal and the quadrature signal based on the phase difference to achieve or maintain a quadrature relationship between the digital transmit signal and the digital received echo signal.

9. The method in claim 1, wherein the digital received echo signal includes multiple echoes, each echo having an associated echo waveform, the method further comprising:
    selecting one of the echoes; and
    determining a sampling location of the waveform associated with the selected echo.

10. The method in claim 9, wherein the sampling location is determined in accordance with the following steps:
    defining an initial tracking window for the selected echo waveform;
    determining an initial echo delay at which point the initial tracking window starts;
    determining a peak value of the selected echo waveform within the initial tracking window; and
    defining a new tracking window relative to a location of the peak value, smaller than the initial tracking window, wherein a length of the new tracking window is determined based on a fraction of an amplitude of the peak value.

11. The method in claim 10, wherein the start of the new tracking window is a nearest point preceding the peak value where the amplitude of the selected echo waveform within the initial tracking window first falls below the fraction of the amplitude of the peak value and the length of the tracking window is a distance between the start of the new tracking window and a point after the peak where the amplitude of the selected echo waveform again first falls below the fraction of the amplitude of the peak value.

12. The method in claim 1, wherein the digital received echo signal includes multiple echoes, each echo having an associated echo waveform, the method further comprising:
detecting multiple received echoes associated with the test sample;
converting the received echoes into digital form;
digitally processing the digital received echoes and the digital transmit signal to determine a corresponding phase relationship between each of the digital received echoes and the digital transmit signal, wherein each phase relationship is associated with a characteristic with the test sample; and
outputting the determined phase relationships or the associated characteristics.

13. A digitally-based measurement apparatus, comprising:
digital processing circuitry configured to generate a digital transmit signal having a predetermined frequency and phase;
digital-to-analog conversion circuitry configured to convert the digital transmit signal into an associated analog transmit signal;
a transducer for directing the analog transmit signal to a test sample;
a detector for detecting a received echo signal associated with the test sample;
analog-to-digital conversion circuitry for converting the received echo signal into digital form,
wherein the digital processing circuitry is further configured to process the digital received echo signal and the digital transmit signal to determine a phase relationship between the digital received echo signal and the digital transmit signal, wherein the phase relationship is associated with a characteristic with the test sample, and to output the phase relationship or the associated characteristic.

14. The apparatus in claim 13, wherein the digital processing circuitry is further configured to digitally process the digital received echo signal and the digital transmit signal to determine an amplitude of the digital received echo signal and to output the determined amplitude.

15. The apparatus in claim 13, wherein the digital processing circuitry is further configured to adjust the digital transmit signal based on the phase relationship to maintain a constant phase relationship between the digital transmit signal and the digital received echo signal.

16. The apparatus in claim 13, wherein the digital processing circuitry is further configured to determine a time delay associated with the phase relationship, wherein the time delay represents the change in time required for the analog signal to propagate through a test sample from one pulse to the next.

17. The apparatus in claim 13, wherein the transducer, upon receiving the analog transmit signal, is operable to radiate a signal that interacts with the test sample to generate one or more echo signals.

18. The apparatus in claim 17, wherein the transducer is configured to receive the echo signal for detection by the detector.

19. The apparatus in claim 17, further comprising another transducer for receiving the echo signal for detection by the detector.

20. The apparatus in claim 13, wherein the phase relationship is a phase difference, wherein the digital processing circuitry is further configured to:
generate a digital quadrature signal of the digital transmit signal;
multiply the digital received echo signal by the digital transmit signal to produce a first product;
multiply the digital received echo signal by the digital quadrature signal to produce a second product;
filter a higher frequency component from the first and second products; and
calculate the phase difference from the filtered first and second products.

21. The apparatus in claim 20, wherein the digital processing circuitry is further configured to calculate an amplitude of the digital received echo signal from the filtered first and second products.

22. The apparatus in claim 20, wherein the digital processing circuitry is further configured to adjust the digital transmit signal and the quadrature signal based on the phase difference to achieve or maintain a quadrature relationship between the digital transmit signal and the digital received echo signal.

23. The apparatus in claim 20, wherein the digital received echo signal includes multiple echoes, each echo having an associated echo waveform, and wherein the digital processing circuitry is further configured to:
select one of the echoes; and
determine a sampling location of the waveform associated with the selected echo.

24. The apparatus in claim 23, wherein the digital processing circuitry is further configured to:
define an initial tracking window for the selected echo waveform
determine an initial echo delay at which point the initial tracking window starts;
determine a peak value of the selected echo waveform within the initial tracking window; and
define a new tracking window relative to a location of the peak value, smaller than the initial tracking window, wherein a length of the new tracking window is based on a fraction of an amplitude of the peak value.

25. The apparatus in claim 24, wherein the start of the new tracking window is a nearest point preceding the peak value where the amplitude of the selected echo waveform within the initial tracking window first falls below the fraction of the amplitude of the peak value and the length of the tracking window is a distance between the start of the new tracking window and a point after the peak where the amplitude of the selected echo waveform again first falls below the fraction of the amplitude of the peak value.

26. The apparatus in claim 13, wherein the digital received echo signal includes multiple echoes, each echo having an associated echo waveform, and wherein the digital processing circuitry is further configured to:

detect multiple received echoes associated with the test sample;

convert the received echoes into digital form;

process the digital received echoes and the digital transmit signal to determine a corresponding phase relationship between each of the digital received echoes and the digital transmit signal, wherein each phase relationship is associated with a characteristic with the test sample; and output the determined phase relationships or the associated characteristics.

* * * * *